(No Model.) 2 Sheets—Sheet 1.

H. SULZER & A. SCHMIDT.
MACHINE FOR HOLLOWING PRECIOUS OR OTHER STONES.

No. 450,644. Patented Apr. 21, 1891.

Witnesses:
Henry J. Dieterich
B. H. Sommers

Inventor:
Hans Sulzer, and
Albert Schmidt
Henry Wh.
Attorney.

(No Model.) 2 Sheets—Sheet 2.
H. SULZER & A. SCHMIDT.
MACHINE FOR HOLLOWING PRECIOUS OR OTHER STONES.
No. 450,644. Patented Apr. 21, 1891.

Witnesses:
Henry G. Dieterich
B. W. Sommers

Inventor:
Hans Sulzer and
Albert Schmidt
Henry Orth
Attorney

UNITED STATES PATENT OFFICE.

HANS SULZER, OF WINTERTHUR, AND ALBERT SCHMIDT, OF GLATTFELDEN, ASSIGNORS TO H. SULZER & CO., OF WINTERTHUR, SWITZERLAND.

MACHINE FOR HOLLOWING PRECIOUS OR OTHER STONES.

SPECIFICATION forming part of Letters Patent No. 450,644, dated April 21, 1891.

Application filed June 3, 1890. Serial No. 354,159. (No model.)

*To all whom it may concern:*

Be it known that we, HANS SULZER, a citizen of Switzerland, residing at Winterthur, in Switzerland, and ALBERT SCHMIDT, a citizen of Germany, residing at Glattfelden, in Switzerland, have invented certain new and useful Improvements in Machines for Hollowing Precious and other Stones, of which the following is a specification.

Figure 1:
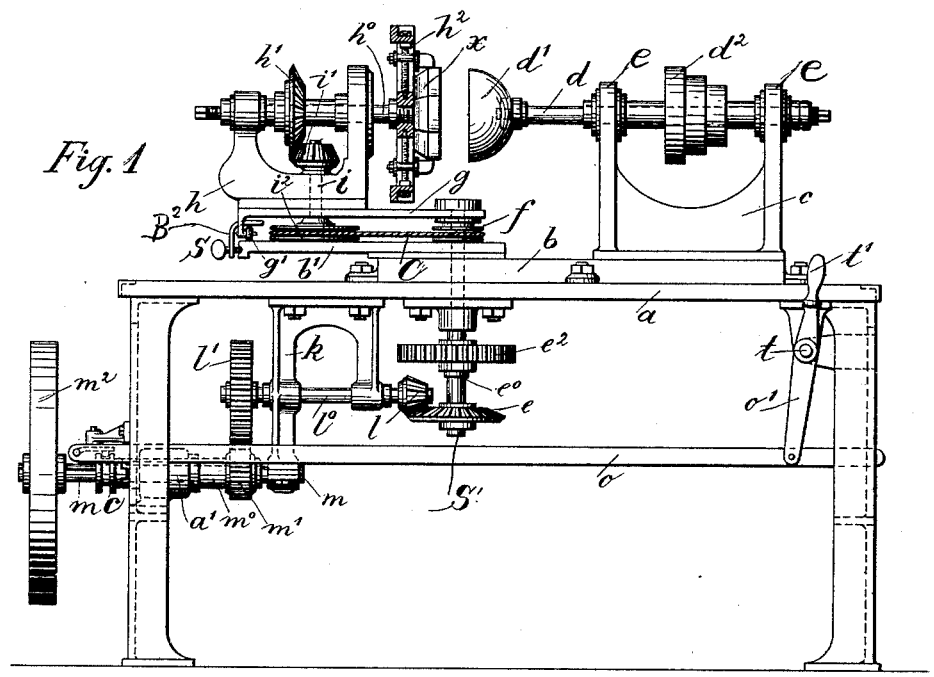
Figure 3:
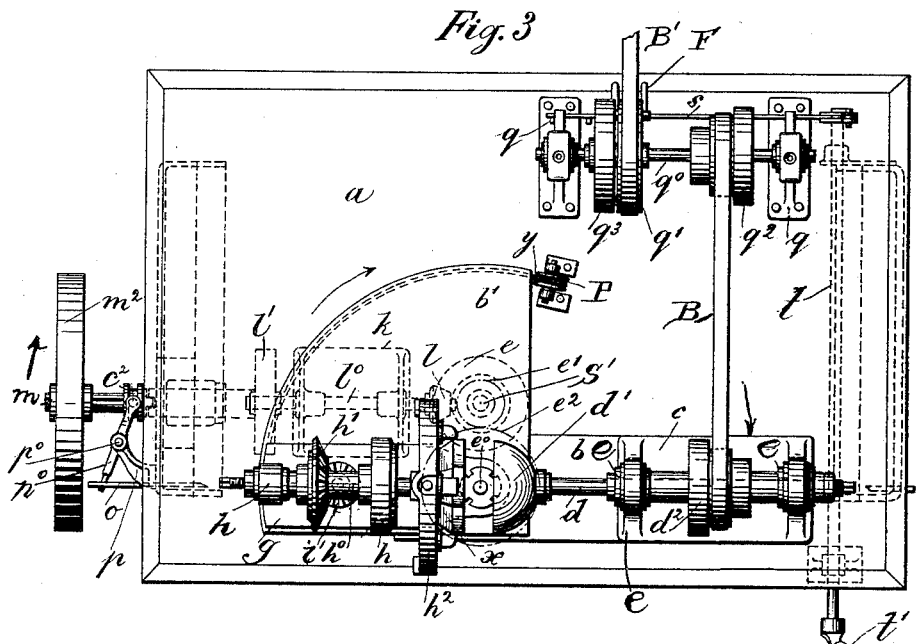
Figure 2:
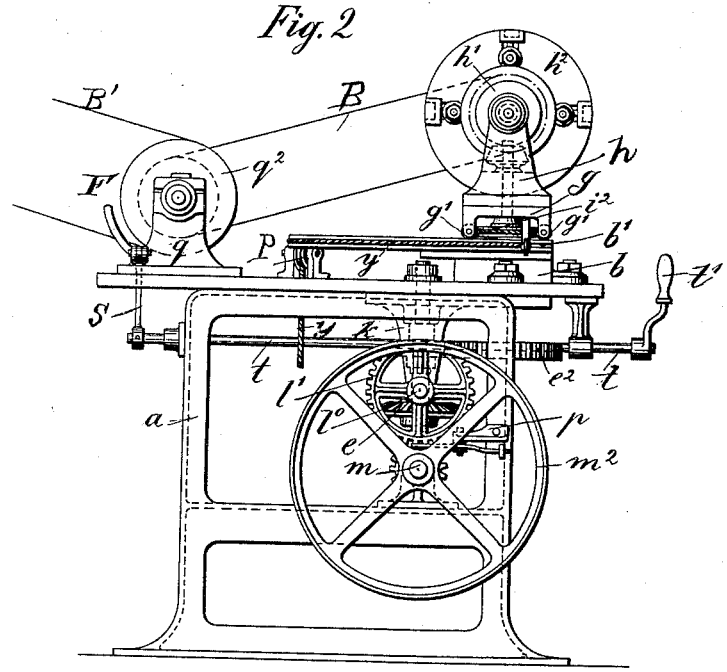
Figure 4:
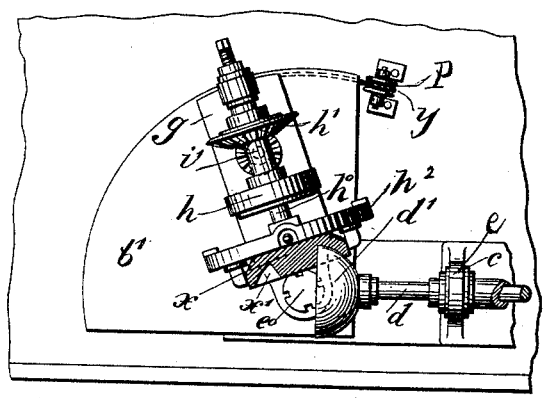

Referring to the drawings, in which like letters indicate like parts, Figure 1 is a front elevation, Fig. 2 a left end elevation, and Fig. 3 a top plan view, showing the normal relative positions of the cutter and work-holder. Fig. 4 is a sectional top plan of a portion of the apparatus, illustrating the relative positions of the cutter and work-holder when the latter is at the limit of its movement.

In the preparation of semi-precious stones for market, and in order to enhance their brilliancy, it has been customary to hollow them out more or less, and this is generally done by hand.

Our invention has for its object to provide a machine adapted to perform this work automatically; and it consists, essentially, in the construction of the machine and in the combination of co-operative elements, as will now be fully described.

In the drawings, $d$ is a tool or cutter shaft that carries the cutter $d'$, which consists, essentially, of a hemispherical body of copper secured to said shaft $d$, which also carries a step-pulley $d^2$ and is revoluble in bearings $e$, secured to or formed on a bed-plate $c$, bolted to a table $a$. The shaft $d$ is driven by belt B, belted to a step-pulley $q^2$ on a parallel driving-shaft $q^\circ$, also mounted on the table and carrying the fast and loose pulleys $q'$ and $q^3$, respectively. The shaft $q^\circ$ is driven by a belt B', belted to any suitable prime motor-pulley, and said belt is shifted from the fast to the loose pulley, and vice versa, by means of the shifting-fork F, adapted to be operated by a rod $t$ and a radial arm $s$ thereon, said rod having its bearings beneath the table $a$ and carrying a hand-lever $t'$, as shown in Figs. 2 and 3.

To the bed-plate $b$ is secured a quadrant or sector plate $b'$, upon which is mounted a carriage $g$, that is provided at one end with rollers $g'$, that have their bearings in suitable lugs or ears, as shown in Fig. 2. The sector has a peripheral groove for the reception of a cord or chain $y$, one end of which is secured to the carriage $g$ through the medium of screw S, working in a bracket B², secured to said carriage $g$. (See Fig. 1.)

The screw S not only serves as a means for locking the carriage against motion on the sector when this is desired or necessary, but also to connect said carriage to the driving chain or cord $y$, which passes over a pulley P, that has its bearings on the table $a$, and said rope or chain $y$ has a weight (not shown) attached to its free end.

The carriage $g$ at its front end is provided with a bearing for the upper end of a vertical shaft $e^\circ$, that carries a grooved pulley $f$ between the carriage and sector $b'$, and the latter is provided with a suitable bearing or step for the lower end of a second vertical shaft $i$, that carries a grooved pulley $i^2$, connected with the pulley $f$ by means of a cord C.

To the carriage $g$ is secured a standard $h$, in which are formed the bearings for the horizontal spindle or shaft $h^\circ$, that carries the chuck $h^2$ for the stone, and said spindle also carries a bevel-pinion $h'$, in gear with the bevel-pinion $i'$ on the upper end of shaft $i$. When in its normal position the spindle or shaft $h^\circ$ lies in the same plane as the spindle or shaft $d$, that carries the hemispherical cutter $d'$, and said spindle $h^\circ$ is driven from shaft $e^\circ$, through the medium of the cord C, pulleys $f$ $i^2$, and pinions $i'$ $h'$. The vertical shaft $e^\circ$ lies in the center of the circle of which the sector is a segment, and constitutes the pivot about which the carriage $g$ revolves, while the spindles $d$ and $h^\circ$ lie in a horizontal plane that intersects the vertical plane of said shaft $e^\circ$. The shaft $e^\circ$ carries a gear-wheel $e^2$, that is in gear with a pinion $e'$ on a third vertical shaft S', that also has its bearings in the table $a$, or in suitable bearing-brackets secured thereto, and carries a bevel-pinion $e$ in gear with a like pinion $l$ on a horizontal counter-shaft $l^\circ$, mounted in a hanger $k$, secured to the table $a$. The said shaft $l^\circ$ carries a gear-wheel $l'$, which latter is in gear with a pinion $m'$, secured to a sleeve $m°$, loose on a horizontal driving-shaft $m$, which also carries a belt-pulley $m^2$ and a coupling-sleeve $c^2$, having endwise motion on said shaft, as usual, and adapted to engage the end of sleeve $m°$ and connect the same to the shaft, thus forming an ordinary clutch-coupling that is operated by means of a lever $n°$, fulcrumed at $p°$ to a bracket $p$, and engaging the groove in the coupling-sleeve, as shown in Fig. 3. The other end of the lever $n°$ is connected to a bar $o$, and the latter by means of an arm $o'$ to the belt-shifting rod $t$.

The arrangement of the coupling connections relatively to the belt-shifting devices hereinabove described is such that when the lever $t'$ is moved in one direction the belt $B'$ will be shifted from the loose to the fast driving-pulley on shaft $q°$, and simultaneously therewith the coupling-sleeve $c°$ will be moved into engagement with the pinion-sleeve $m°$ to revolve the shafts $d\ e°$, the latter shaft being driven from shaft $m$ through the described intermediate mechanism, said shaft $m$ having a continuous motion. When the lever $t'$ is moved in a reverse direction, the belt $B'$ is shifted back to the loose pulley $q^3$ on shaft $q°$, and the coupling-sleeve $c^2$ is disengaged from the pinion-sleeve $m°$. As the shafts $d\ e°\ h°$ are set in motion and as the cutting proceeds, the carriage $g$ will under the stress of the weight revolve in the direction of the arrow, Fig. 3, until it reaches the position shown in Fig. 4.

The adjustment of the shaft $h°$ or that of said shaft and of the shaft $d$ to bring the stone to the cutter $d'$ and the feeding of the said shaft or shafts as the cutting proceeds is effected in the same manner as in an ordinary lathe, and need therefore no further description, as the means employed for these purposes are well known. Of course the shafts $d$ and $h°$ revolve in opposite directions, as will readily be understood. By means of the hemispherical cutter or tool $d'$ a substantially V-shaped groove $x'$ is cut in the stone $x$, as shown in Fig. 4.

Having thus described our invention, what we claim, and desire to secure by Letters Patent, is—

1. In a machine of the class described, the combination, with a revoluble horizontal cutter-spindle, of a horizontal chuck-spindle, revoluble in a reverse direction about a vertical axis, driving mechanism for said spindle, and shifting devices adapted to simultaneously shift said driving mechanism into or out of connection with the prime motive power, substantially as and for the purpose specified.

2. In a machine of the class described, the combination, with the carriage $g$, spindle $h°$, sector $b'$, and cord or chain $y$, connected with the carriage $g$, the spindle $i$, carrying grooved pulley $i^2$, pinion $i'$ in gear with pinion $h'$ or spindle $h°$, of the shaft $e°$, carrying a grooved pulley $f$, the cord C, connecting pulley $f$ with pulley $i^2$ on shaft $i$, and mechanism for revolving shaft $e°$, substantially as and for the purposes specified.

3. In a machine of the class described, the combination, with the carriage $g$, spindle $h°$, carrying the pinion $h'$, sector $b'$, and cord or chain $y$, connected to carriage $g$, the vertical shaft $e^0$, carrying gear-wheel $e^2$ and grooved pulley $f$, the vertical shaft $i$, carrying grooved pulley $i^2$, the cord C, connecting pulleys $i^2$ and $f$, and the pinion $i'$ on shaft $i$ in gear with pinion $h'$ on shaft $h°$ of the shaft $S'$, carrying gear-wheel in gear with wheel $e^2$ on shaft $e^0$, the pinion $e'$ on shaft $S'$, the gear-wheel $l'$ on shaft $l°$, the driving-shaft M, the pinion $m'$, loose on said shaft and in gear with wheel $l'$ on shaft $l°$, and a clutch-coupling for coupling said pinion $m'$ to shaft $m$, substantially as and for the purposes specified In testimony whereof we hereunto sign our names, in the presence of two subscribing witnesses, this 12th day of April, 1890.

HANS SULZER.
ALBERT SCHMIDT.

Witnesses:
JACOB BREMS,
EMIL BLUM.